US009081614B2

(12) United States Patent
Chen et al.

(10) Patent No.: US 9,081,614 B2
(45) Date of Patent: Jul. 14, 2015

(54) MANAGING SHARED RESOURCES IN A MULTI-COMPUTER SYSTEM WITH FAILOVER SUPPORT

(75) Inventors: Chien Chi Chen, Taipei (TW); Yun-Ting Hsu, Taipei (TW); Yen Shin Lee, Taipei (TW); Hung-Jen Wu, Yilan (TW)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 480 days.

(21) Appl. No.: 13/168,355

(22) Filed: Jun. 24, 2011

(65) Prior Publication Data
US 2012/0005348 A1 Jan. 5, 2012

(30) Foreign Application Priority Data
Jun. 30, 2010 (TW) .............................. 99121630 A

(51) Int. Cl.
*G06F 15/173* (2006.01)
*G06F 9/50* (2006.01)
(Continued)

(52) U.S. Cl.
CPC ................ *G06F 9/5011* (2013.01); *G06F 9/52* (2013.01); *G06F 11/2028* (2013.01); *G06F 11/2033* (2013.01); *H04L 41/0886* (2013.01); *H04L 63/06* (2013.01); *H04W 40/24* (2013.01)

(58) Field of Classification Search
USPC ......................................................... 709/226
See application file for complete search history.

(56) References Cited

U.S. PATENT DOCUMENTS 6,823,472 B1 11/2004 DeKoning et al.
6,871,300 B1 3/2005 Irving
(Continued)

FOREIGN PATENT DOCUMENTS

CN 101520739 A 9/2009
CN 101594376 A 12/2009
(Continued)

OTHER PUBLICATIONS

Regula, "Use PCIe In Multi-Processor System Configurations", www.eetindia.co.in [online], Aug. 2008 [accessed online Jun. 24, 2011] pp. 1-3, URL: http://www.eetindia.co.in/STATIC/PDF/200808/EEIOL_2008AUG14_INTD_TA_01.pdf?SOURCES=DOWNLOAD.

(Continued)

*Primary Examiner* — Richard G Keehn
(74) *Attorney, Agent, or Firm* — Edward J. Lenart; Katherine S. Brown; Kennedy Lenart Spraggins LLP

(57) ABSTRACT

Managing shared resources in a multi-computer system with failover support, including: reading priority detection signals from a computer inserted into the multiple-computer system, the priority detection signals representing a priority of the inserted computer; reading planar detection signals from the computer, the planar detection signals representing an insertion state of all computers currently inserted into the multiple-computer system; determining if the computer has the highest priority among all the computers inserted into the multiple-computer system in accordance with the priority detection signals and the planar detection signals; and, in response to determining that the computer has the highest priority, monitoring shared resources and outputting a specific output signal associated with the highest priority computer, the specific output signal providing an identification of the highest priority computer to other computers currently inserted into the multiple-computer system and representing control, by the highest priority computer, of the shared resources.

15 Claims, 2 Drawing Sheets

(51) Int. Cl.
*H04L 29/06* (2006.01)
*G06F 11/20* (2006.01)
*H04L 12/24* (2006.01)
*H04W 40/24* (2009.01)
*G06F 9/52* (2006.01)

(56) References Cited

U.S. PATENT DOCUMENTS

| | | |
|---|---|---|
| 7,085,961 B2 | 8/2006 | Chang et al. |
| 7,337,243 B2 | 2/2008 | Hawkins et al. |
| 7,657,677 B2 | 2/2010 | Huang et al. |
| 7,698,487 B2 | 4/2010 | Rothman et al. |
| 7,710,718 B2 | 5/2010 | Merkin et al. |
| 2004/0153697 A1* | 8/2004 | Chang et al. ..................... 714/4 |
| 2004/0215709 A1* | 10/2004 | Basani et al. ................ 709/201 |
| 2005/0063005 A1* | 3/2005 | Phillips et al. ............... 358/1.15 |
| 2006/0156041 A1* | 7/2006 | Zaretsky et al. ............. 713/300 |
| 2006/0224708 A1 | 10/2006 | Hawkins |
| 2007/0098012 A1* | 5/2007 | Pettey et al. ................. 370/463 |
| 2007/0180449 A1* | 8/2007 | Croft et al. ....................... 718/1 |
| 2007/0198656 A1* | 8/2007 | Mazzaferri et al. .......... 709/218 |
| 2008/0205418 A1* | 8/2008 | Rose et al. .................... 370/401 |
| 2009/0094467 A1* | 4/2009 | Baba et al. .................... 713/300 |
| 2009/0259741 A1* | 10/2009 | Shen et al. .................... 709/223 |
| 2009/0271569 A1 | 10/2009 | Kannan |
| 2009/0271573 A1 | 10/2009 | Kannan |
| 2009/0292801 A1 | 11/2009 | Yang et al. |
| 2009/0327778 A1* | 12/2009 | Shiga et al. ................... 713/320 |
| 2010/0005468 A1* | 1/2010 | Chang et al. .................. 718/102 |
| 2010/0180135 A1* | 7/2010 | Lambert ........................ 713/323 |
| 2010/0332862 A1* | 12/2010 | Lester et al. .................. 713/300 |
| 2011/0134749 A1* | 6/2011 | Speks et al. ................... 370/217 |
| 2011/0154324 A1* | 6/2011 | Pagan et al. ....................... 718/1 |
| 2011/0231602 A1* | 9/2011 | Woods et al. ................. 711/112 |
| 2011/0252254 A1* | 10/2011 | Kameda et al. ............... 713/320 |
| 2011/0320826 A1* | 12/2011 | Simmons et al. ............. 713/300 |

FOREIGN PATENT DOCUMENTS

| | | |
|---|---|---|
| TW | I220823 B | 9/2004 |
| TW | 200818010 A | 4/2008 |
| TW | I298130 B | 6/2008 |

OTHER PUBLICATIONS

Hinnelund, "Autonomic Computing—A Method for Automated Systems Management", Master's Thesis in Computer Science, www.sics.se [online], Mar. 2004 [accessed online Jun. 24, 2011], pp. 1-47 URL:http://www.sics.se/isl/autonomic/mthesis_ac.pdf.

* cited by examiner

MANAGING SHARED RESOURCES IN A MULTI-COMPUTER SYSTEM WITH FAILOVER SUPPORT

CLAIM OF PRIORITY

This application claims priority under 35 U.S.C §119 to Taiwanese Patent Application No. 99121630, filed Jun. 30, 2010, the entire text of which is specifically incorporated by reference herein.

BACKGROUND OF THE INVENTION

1. Field of the Invention

The field of the invention is data processing, or, more specifically, methods, apparatus, and products for managing shared resources in a multi-computer system with failover support.

2. Description of Related Art

In this blooming internet era, network computer systems, such as servers, are widely used. The data and information thereof are properly processed and managed via various server management technologies.

In commercial settings, multiple computer enclosures are sometimes mounted in a conventional vertical rack structure. This technique is referred to as a rack-mount (or shelf) server system, or simply a rack, that are accessed remotely via a network. Most rack structures include horizontal slots or drawers in which computer enclosures are received, thereby creating a stack arrangement of the computer enclosures. Each computer enclosure contains a computer. When there are a large number of computers in a single rack, it is impractical for each one to have its own separate keyboard, mouse, and monitor. Instead, a KVM switch is used to share a single keyboard/video/mouse set amongst many different computers in a single rack.

To save cost, each computer may share the same resources such as power supply or fans etc. Each computer also provides a BMC (Baseboard Management Controller), such as VSC 452 BMC provided by Maxim Corp. or SE-SM4210-P01 BMC provided by ServerEngines Corp. The BMC is a specialized microcontroller generally embedded on the motherboard of the computer, generally a server, for managing the interface between system management software and hardware. For example, a BMC can monitor sensors built into the computer, such as temperature, cooling fan speeds, power status, operating system (OS) status etc., and can send alerts to a system administrator via the network if any of the parameters do not stay within preset limits, indicating a potential failure of the system.

Since a single resource will be shared by multiple planars, there would be a demand for deciding which system management controller is in charge of monitoring and reporting the shared resource. A common solution for shared resource management, for example, is providing an additional system management controller residing at the chassis side to monitor the shared resource. But this will need an additional cost for the additional system management controller, such as an Advanced Management Module (AMM) in Blade system. Another solution is to only give access to one specific system management controller, while the others do not have the connection to manage the shared resource. This will add limitations to the system and do not have failover support ability, which is the solution of IBM iDataplex system is now using.

Accordingly, it would be advantageous to provide a solution having failover support ability on servers which also has a low cost and simpler implementation for software/hardware parts than known solutions on the current servers.

SUMMARY OF THE INVENTION

Methods and apparatus for managing shared resources in a multiple-computer system with failover support are disclosed in this specification. Managing shared resources in accordance with embodiments of the present invention may include: reading priority detection signals from a computer inserted into the multiple-computer system, the priority detection signals representing a priority of the inserted computer; reading planar detection signals from the computer, the planar detection signals representing an insertion state of all computers currently inserted into the multiple-computer system; determining if the computer has the highest priority among all the computers inserted into the multiple-computer system in accordance with the priority detection signals and the planar detection signals; and in response to determining that the computer has the highest priority, monitoring shared resources and outputting a specific output signal associated with the highest priority computer, the specific output signal providing an identification of the highest priority computer to other computers currently inserted into the multiple-computer system and representing control, by the highest priority computer, of the shared resources.

Managing shared resources in accordance with embodiments of the present invention may also include: reading priority detection signals from a computer inserted into the multiple-computer system, the priority detection signals representing a priority of the inserted computer; reading planar detection signals from the computer, the planar detection signals representing an insertion state of all computers currently inserted into the multiple-computer system; determining that another computer has the highest priority among all the computers inserted into the multiple-computer system in accordance with the priority detection signals and the planar detection signals; detecting a failure of the highest priority computer, including determining that the highest priority computer is not outputting a specific output signal associated with the highest priority computer, the specific output signal providing an identification of the highest priority computer to other computers currently inserted into the multiple-computer system and representing control, by the highest priority computer, of the shared resources; determining whether the computer has the highest priority among all the active computers in accordance with the priority detection signals and the planar detection signals; and in response to determining that the computer has the highest priority among all the active computers, outputting a specific output signal associated with the highest priority active computer, the specific output signal representing a message that the shared resources have been released by the failed computer and are under control by another active computer having the highest priority currently inserted into the multiple-computer system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
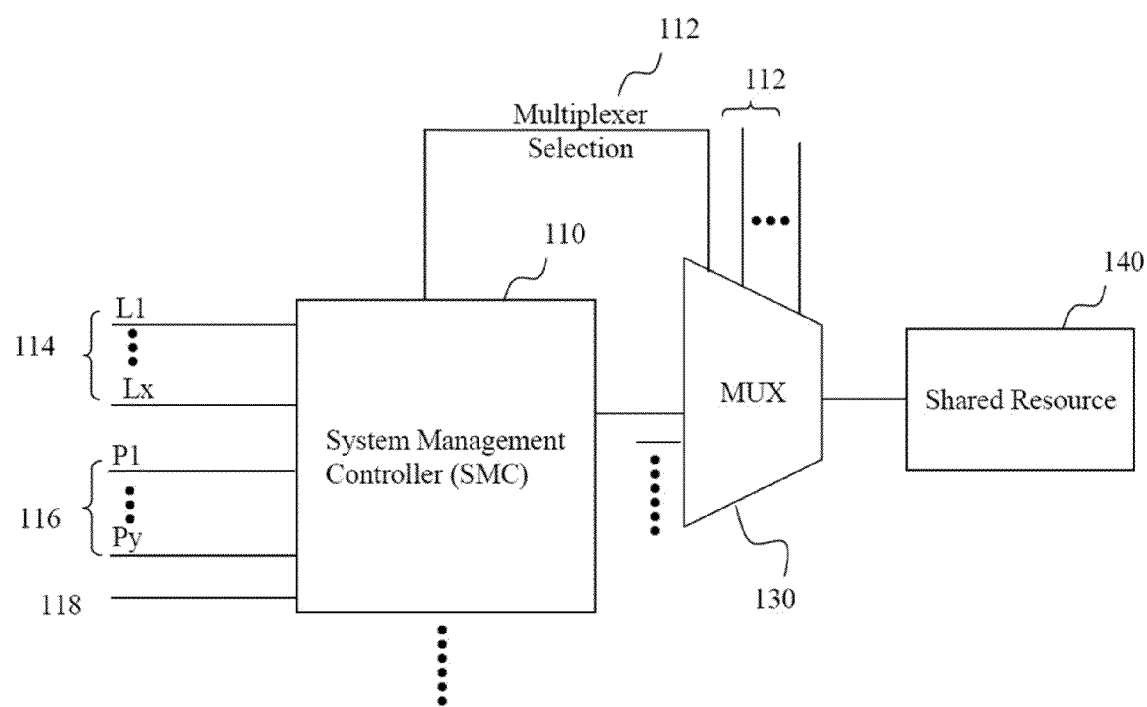
FIG. 1 is an exemplary diagram of hardware implementation of failover support for a multiple-computer system according to embodiments of the present invention.

As will be appreciated by one skilled in the art, embodiments of the present invention may include a system, a method or a computer program product. Embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
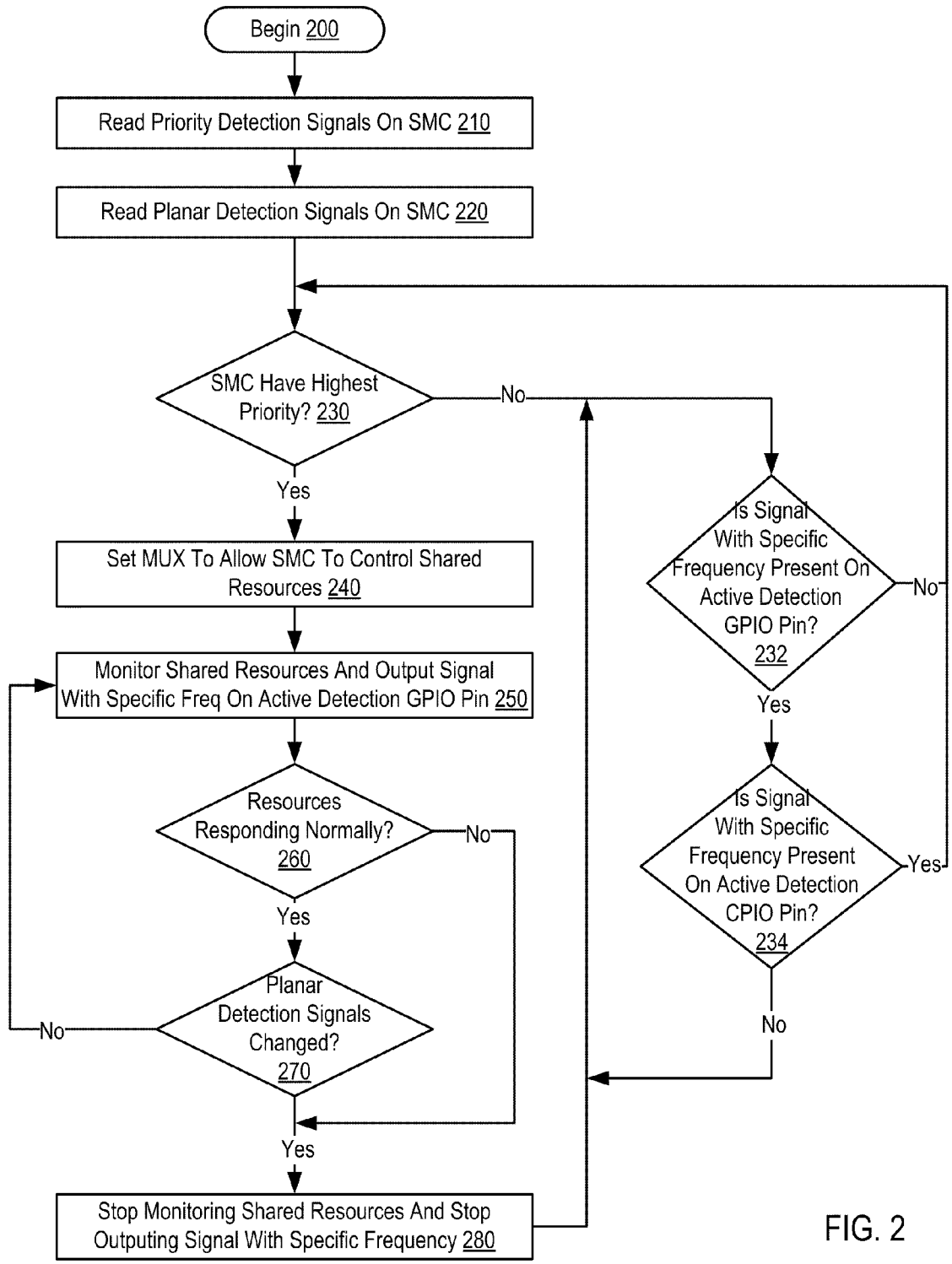
FIG. 2 is a flowchart illustrating an exemplary method of managing shared resources in accordance with embodiments of the present invention.

Referring now to FIG. 1 through FIG. 2, a system, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an exemplary diagram of hardware implementation of failover support for a multiple-computer system according to one embodiment of the present invention. In this exemplary embodiment, the multiple-computer system is a rack-mount server system. Each computer at least comprises a planar (or herein also called a motherboard) which comprises a bus, a memory connected to the bus, in which the memory comprises a set of instructions, and a processor connected to the bus in order to execute the set of instructions. According to the embodiment of the present invention, the processor is preferably a system management controller on the planar. As illustrated, the hardware implementation includes a multiplexer 130 having a control input for controlling shared resources 140, such as mentioned power supply or fans etc. The multiplexer 130 has inputs connecting control outputs from system management controller 110 on the planar for controlling the shared resources. Hence, the multiplexer 130 is shared by the system management controller 110 on each planar within the rack, and thus generally is built in a mid-plane (not shown) within the rack. The mid-plane is a system integration interface allowing one computer to share the resources within the rack with other computers within the rack through the connectors (not shown). It should be noted that the controller 110 may also be implemented as an independent controller.

The system management controller on the planar of each computer has General Purpose I/O (GPIO) pins as a handshake communication channel among different planars within the rack-mount server system. Each system management controller includes two sets of GPIO pins, respectively as priority detection GPIOs (L1 . . . Lx) 114 and planar detection GPIOs (P1 . . . Py) 116. When a computer is inserted into a position within the rack for connection with the rack in order to share the resource within the rack via a connector on the mid-plane within the rack, the rack will assign a unique "position code" as an identifier (ID) dependent on position in the rack to the priority detection GPIOs 114, and inform other computers within the rack of the insertion state via planar detection GPIOs 116. For example, the rack can contain at most eight computers, and thus the priority detection GPIOs 114 are only required with 3 bits (23=8) position code, while the planar detection GPIOs 116 may be required with eight bits of which each one is corresponding to the insertion state of each computer currently inserted into the rack. According to the embodiment of the present invention, the system management controller on each planar may be assigned a different priority dependent on the position which the planar is inserted into the rack. Also, the computers within the rack can obtain the insertion state of each computer being currently inserted into the rack by accessing the signals on the planar detection GPIOs 116 on the system management controller. The computers currently being inserted into the rack will also record the insertion state.

The system management controller in the computer determines if it has the highest priority among all the system management controllers on the planars in the computers currently inserted into the rack in accordance with the planar detection GPIOs 116 representing the insertion state of computers currently inserted into the rack and the priority detection GPIOs 114 having a unique position code representing the position of the computer within the rack. The priority detection GPIOs 114 and the planar detection GPIOs 116 on the system management controller are respectively used to indicate which position in the rack the planar is inserted into and which other planar(s) is inserted in the rack. Hence, each can determine if the system management controller has the highest priority among all the system management controllers on the planars in the computers currently inserted into the rack by accessing the signals on the priority detection GPIOs 114 and the planar detection GPIOs 116.

The priority of each computer within the rack is not restricted to be determined according to the position as herein disclosed. Actually, other factors to be used to assign the priority dependent on needs, for example, whether the Ethernet connection is active may be a factor in addition to the position factor, or the priority may be determined according to the inserting sequence of computers within the rack.

The hardware implementation further includes one active detection GPIO pin 118 shared by the system management controller 110 on the planar of each computer within the rack for actively detecting whether the system management controller which is currently managing the shared resources is still normally active (or functioning). When the system management controller with the highest priority among the active system management controllers gains the right to control the shared resources, it will send out a signal with a unique output frequency associated with the system management controller on the active detection GPIO pin 118 to notify other system management controller(s) with the lower priority that the shared resources have been taken over. Each system management controller, when it takes over the shared resources, will output a signal having its specific output frequency for other system management controller(s) to identify which system management controller takes over the shared resources.

FIG. 2 is a flowchart of a failover support module built in each system management controller shown in FIG. 1 in accordance with one embodiment of the present invention. First, the system management controller on the planar reads the signals on the priority detection GPIOs 114 (step 210), and the signals on the planar detection GPIOs 116 (step 220). Then, at step 230, the system management controller checks whether it itself has the highest priority among all the system management controllers on the planars in the computers "currently" inserted into the rack.

If the system management controller does not have the highest priority, it will further check whether there is a signal with a specific output frequency present on the active detection GPIO pin 118, in order to determine whether there is another system management controller which is monitoring the shared resources (step 232). If it is detected that no signal is present, then the process will go back to step 230 to determine the priority again, so as to find out a certain system management controller having the highest priority among all the active system management controllers on the planars in the computers "currently" inserted into the rack. If there is a signal with a specific output frequency present on the active detection GPIO pin 118, it means the shared resources have been taken over by a certain system management controller with the highest priority. The process further checks whether the signals on the planar detection GPIOs 116 are changed in order to determine whether there is a planar being newly inserted into the rack that means there is a system management controller newly added into the rack (step 234). As a result, the process will go back to step 230 to determine the priority again, if the signals are changed. Otherwise, the detection of the step 232 will be repeated.

At step 230, the system management controller having the highest priority will take over the shared resources 140. As a result, the system management controller will send out a multiplexer selection signal 112 to permit the system management controller to control the shared resources 140 (step 240). Meanwhile, the system management controller will be able to monitor and manage the shared resources and send out a signal with a specific output frequency associated with the system management controller on the active detection GPIO pin 118 so as to notify other system management controller(s) with a lower priority that the shared resources have been taken over (250). And thus, the signal with the specific output frequency is used by other system management controller(s) to identify and recognize that the system management controller is taking over the shared resources. The identification result will be recorded in all computers currently inserted into the rack.

Afterward, the system management controller will further check if the shared resources 140 is responding normally (i.e. being controlled normally) in order to determine whether the shared resources 140 is taken over by another system management controller with a higher priority (step 260). If it is checked that there is no normally responding from the shared resources, the system management controller will stop monitoring the shared resources 140, and stop sending out the signal with the specific output frequency on the active detection GPIO pin 118 (step 280), so as to release the shared resources 140 whereby another system management controller with the highest priority among all the system management controllers currently within the rack can take over the shared resources. Then, the process of the failover support module will go back to step 232 to check whether there is a signal with another specific output frequency provided by another system management controller on the shared active detection GPIO pin, so as to determine whether the shared resources have been taken over. As mentioned above, if the shared resources 140 have been taken over, then the process further checks whether the signals on the planar detection GPIOs 116 are changed in order to determine whether there is a system management controller newly added into the rack (step 234)

Referring back to step 260, if it is checked that there is normally responding from the shared resources, the process further checks whether the signals on the planar detection GPIOs 116 are changed, and whether the system management controller no longer has the highest priority (step 270). If there is no change on the planar detection GPIOs 116, then the process will go back to step 250 to remain monitoring the shared resources and continuously send out the signal with the specific output frequency on the active detection GPIO pin 118. Otherwise, the system management controller will stop monitoring the shared resources 140, and stop sending out the signal with the specific output frequency on the active detection GPIO pin 118 (step 280).

In the preferred embodiment of the present invention, when a new planar is inserted into or removed from the rack, all planars will know the change through monitoring the planar detection GPIOs 116. The failover support module within the system management controller of each planar will thus check if it itself has the highest priority among all the system management controllers on the planars in the computers currently inserted into the rack. The system management controller having the highest priority will be in charge of managing the shared resources, and the others will standby and wait until the system management controller has a failure or there is/are any planar(s) being inserted into or removed from the rack.

When the system management controller having the highest priority is functioning, all the other active system management controllers, i.e. the remaining system management controllers, will always monitor the active detection GPIO pin 118 to determine if the system management controller is functioning (step 232). Once the system management controller has a failure, it will not send out the signal with the specific output frequency associated with the system management controller on the active detection GPIO pin 118. Thus, the other system management controller(s) which always monitors the active detection GPIO pin 118 will "know" that a failure occurred to the system management controller according to the signal with the specific output frequency, and the shared resources are thus released. Thus, the other system management controller(s) will go back to step 230 to determine which system management controller(s) has the highest priority again. Then, the "determined" system management controller having the highest priority among all the remaining active system management controllers on the planars in the computers currently inserted into the rack can take over the shared resources 140, and send out a signal with another unique output frequency specific to the "determined" system management controller on the active detection GPIO pin 118 to notify other system management controller(s) with the lower priority that the shared resources have been taken over.

As stated above, a different system management controller has a signal with a different output frequency, and hence, when a certain system management controller takes over the shared resources 140, the signal with the specific output frequency associated with the certain system management controller will be used for identification by other system management controllers within the rack, and the result will be also recorded in all the computers currently inserted into the rack.

When the certain system management controller has a failure, it will also be identified and the result will be also recorded in all the computers currently inserted into the rack. As a result, the failover support module within each system management controller can proceed a priority determining step again to select a system management controller having the highest priority among all the remaining active system management controllers except the failed one on the planars in the computers currently inserted into the rack, while not affected by the fact that the failed system management controller, which recently managed the shared resources 140, is still inserted into the rack.

The embodiment of the present invention does not limit to assign a signal having a different output frequency to a different system management controller on the active detection GPIO pin 118 for identification as disclosed herein. Any type of signals capable of being used for identification can be applied to the system management controllers of the present invention.

Accordingly, as mentioned above, disclosed in the present invention can select one system management controller to manage the shared resources among all the system management controllers on the planars in the computers currently inserted into the rack, and can also re-select another system management controller when the selected system management controller fails. This will ensure that there will always be a system management controller in charge of monitoring the shared resources as long as there is a functioning system management controller on a planar in an inserted computer.

According to the embodiment of the present invention, any changes of the rack-mount server system, such as insertion/removal of a new planar, a failure occurred to the system management controller having the highest priority, or recovery of the system management controller previously having the highest priority etc., can be easily processed by the failover support module of the present invention. For example, when a higher priority system management controller (which is already inserted) is recovered from a failure, it will re-join the rack-mount server system. And after the failover support module of the higher priority system management controller discovers that it has the highest priority, it would take over the management of the shared resource by directly sending out a multiplexer selection signal 112 to switch the multiplexer connection and pull the active detection GPIO pin 118 in its unique output frequency related to the higher priority system management controller. Then, the system management controller previously taking over the shared resources will discover the shared resources 140 is not responding normally in step 260, and thus will go back to step 280 to stop monitoring the shared resources 140, and stop sending out the signal with its specific output frequency related to the system management controller on the active detection GPIO pin 118 (step 280).

Hence, the embodiment of the present invention discloses a multiple-computer system with a failover support mechanism according to a simple hardware and software design, which includes a minor change of hardware with low cost, just needs some GPIOs and a multiplexer (MUX), and the software part is also simply involved in a simple build-in failover support module in each system management controller so as to set up a simple handshake protocol among system management controllers. This mechanism could be easily extended no matter how many planars the rack can insert.

The illustration of the various embodiments herein with reference to the drawings is provided for a better understanding of the characteristics and spirit of these embodiments. It will be understood that the various embodiments are not limited to the particular exemplary embodiment described herein but rather are capable of various modifications and rearrangements without departing from their scope. According to the failover support mechanism disclosed in the embodiment of the present invention, the failover support mechanism can be designed to take over the shared resources by a system management controller, as long as the system management controller having a much higher priority than those currently in the rack being "added" into the rack. However, there may be other failover support mechanisms in other embodiments. For example, the failover support mechanism may be designed to proceed a priority determining step again by each system management controller to select a system management controller having the highest priority among all the remaining active system management controllers except the failed one on the planars in the computers currently inserted into the rack so as to take over the shared resources, only after the system management controller currently in charge of the shared resources has a "failure". That is, before step 230, there is a step of a determination to check if the system management controller currently in charge of the shared resources has a "failure" being added.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing shared resources in a multi-computer system with failover support, the method comprising:
   reading priority detection signals from a computer inserted into the multiple-computer system, the priority detection signals representing a priority of the inserted computer;
   reading planar detection signals from the computer, the planar detection signals representing an insertion state of all computers currently inserted into the multiple-computer system;
   determining if the computer has the highest priority among all the computers inserted into the multiple-computer system in accordance with the priority detection signals and the planar detection signals; and
   in response to determining that the computer has the highest priority, monitoring shared resources and outputting a specific output signal associated with the highest priority computer, the specific output signal providing an identification of the highest priority computer to other computers currently inserted into the multiple-computer system and representing control, by the highest priority computer, of the shared resources, wherein outputting the specific output signal further comprises notifying another computer that the highest priority computer is taking over the shared resources.

2. The method according to claim 1, wherein each computer inserted into the multiple-computer system includes a system management controller which provides the specific output signal, the priority detection signals and the planar detection signals.

3. The method according to claim 2, wherein the specific output signal is associated with the system management controller.

4. The method according to claim 3, further comprising:
   in response to determining that the computer does not have the highest priority, determining the presence of a specific output signal identifying another system management controller in the multi-computer system;
   if no specific output signal identifying another system management controller is present, again determining the priority and selecting, in dependence upon the priority determination, a system management controller having the highest priority among all active system management controllers in the computers currently inserted into the multiple-computer system.

5. The method according to claim 3, further comprising:
   determining whether control of the shared resources is being taken over by another system management controller with a higher priority, including checking whether the shared resources are responding normally;
   in response to determining that control of the shared resources is being taken over by another system management controller, stopping monitoring of the shared resources, and stopping the outputting of the specific output signal thereby releasing the shared resources for another system management controller with the highest priority among all the system management controllers within the multiple-computer system to take over.

6. The method according to claim 1, wherein the shared resources comprise one of: a power supply or a fan.

7. The method according to claim 1, wherein the priority is determined according to one of: the position within the multiple-computer system or the insertion sequence of computers within the multiple-computer system.

8. A method of managing shared resources in a multiple-computer system with failover support, the method comprising:
   reading priority detection signals from a computer inserted into the multiple-computer system, the priority detection signals representing a priority of the inserted computer;
   reading planar detection signals from the computer, the planar detection signals representing an insertion state of all computers currently inserted into the multiple-computer system;
   determining that another computer has the highest priority among all the computers inserted into the multiple-computer system in accordance with the priority detection signals and the planar detection signals;
   detecting a failure of the highest priority computer, including determining that the highest priority computer is not outputting a specific output signal associated with the highest priority computer, the specific output signal providing an identification of the highest priority computer to other computers currently inserted into the multiple-computer system and representing control, by the highest priority computer, of the shared resources;

determining whether the computer has the highest priority among all the active computers in accordance with the priority detection signals and the planar detection signals; and in response to determining that the computer has the highest priority among all the active computers, outputting a specific output signal associated with the highest priority active computer, the specific output signal representing a message that the shared resources have been released by the failed computer and are under control by another active computer having the highest priority currently inserted into the multiple-computer system, wherein outputting the specific output signal further comprises notifying another computer that the highest priority computer is taking over the shared resources.

9. The method according to claim 8, wherein each computer inserted into the multiple-computer system includes a system management controller which provides the specific output signal, the priority detection signals and the planar detection signals.

10. The method according to claim 9, wherein the specific output signal is associated with the system management controller.

11. The method according to claim 10, further comprising:
in response to determining that the computer does not have the highest priority among all active computers, determining whether there is another system management controller monitoring the shared resources, including determining the presence of a specific output signal identifying another system management controller; and
if no specific output signal identifying another system management controller is present, again determining the priority and selecting, in dependence upon the priority determination, a system management controller having the highest priority among all active system management controllers in the computers currently inserted into the multiple-computer system.

12. The method according to claim 8, wherein the shared resources comprise one of: a power supply or a fan.

13. The method according to claim 8, wherein the priority is determined according to one of: the position within the multiple-computer system or the insertion sequence of computers within the multiple-computer system.

14. A multiple-computer system with a failover support to manage shared resources, comprising a plurality of computers; and
a multiplexer for monitoring the shared resources;
wherein each computer comprises a motherboard, the motherboard comprising:
a bus;
memory connected to the bus, stored within the memory, a set of instructions comprising a failover support module; and
a processor connected to the bus, in which the processor executes the set of instructions to carry out the steps of:
reading priority detection signals from a computer inserted into the multiple-computer system, the priority detection signals representing a priority of the inserted computer;
reading planar detection signals from the computer, the planar detection signals representing an insertion state of all computers currently inserted into the multiple-computer system;
determining if the computer has the highest priority among all the computers inserted into the multiple-computer system in accordance with the priority detection signals and the planar detection signals; and
in response to determining that the computer has the highest priority, monitoring shared resources and outputting a specific output signal associated with the highest priority computer, the specific output signal providing an identification of the highest priority computer to other computers currently inserted into the multiple-computer system and representing control, by the highest priority computer, of the shared resources, wherein outputting the specific output signal further comprises notifying another computer that the highest priority computer is taking over the shared resources,
wherein the shared resources are controlled via the multiplexer.

15. The multiple-computer system according to claim 14, wherein:
the processor is a system management controller with the built-in failover support module; and
the specific output signal, the priority detection signals and the planar detection signals utilize General Purpose Input/Output (GPIO) pins on the system management controller as a handshake communication channel among the computers within the multiple-computer system.

* * * * *